United States Patent [19]

Richardson

[11] Patent Number: 4,545,017

[45] Date of Patent: Oct. 1, 1985

[54] WELL DRILLING APPARATUS OR THE LIKE WITH POSITION MONITORING SYSTEM

[75] Inventor: Eugene M. Richardson, Pasadena, Tex.

[73] Assignee: Continental Emsco Company, Dallas, Tex.

[21] Appl. No.: 360,715

[22] Filed: Mar. 22, 1982

[51] Int. Cl.$^4$ ................................................. G01P 3/68
[52] U.S. Cl. ..................................... 364/422; 254/276; 364/565
[58] Field of Search .................. 364/422, 561, 565; 212/153; 173/81, 147, 151; 455/604, 605; 254/270, 273, 276; 356/5; 340/685, 825.23; 343/12 R; 175/45

[56] References Cited

U.S. PATENT DOCUMENTS

| | | | |
|---|---|---|---|
| 2,634,405 | 4/1953 | Stone et al. | 340/685 |
| 3,101,828 | 8/1963 | Wilson | 254/276 |
| 3,164,661 | 1/1965 | Dellon | 364/561 X |
| 4,187,546 | 2/1980 | Heffernan et al. | 364/565 |
| 4,295,201 | 10/1981 | Wiklund | 364/561 |
| 4,334,217 | 6/1982 | Nield et al. | 175/45 X |
| 4,368,824 | 1/1983 | Thomasson | 340/685 X |
| 4,403,857 | 9/1983 | Hölscher | 343/12 R |

Primary Examiner—Errol A. Krass
Assistant Examiner—Edward R. Cosimano
Attorney, Agent, or Firm—Arnold, White & Durkee

[57] ABSTRACT

A well drilling apparatus includes a monitoring system for monitoring the exact elevation of the traveling block. The monitoring system detects the elevation of the traveling block by means of periodically transmitted signals which are reflected back to the monitoring system by the traveling block. The apparatus further includes a control system preferably including an industrial control digital computer which is responsive to the elevation of the traveling block and controls the drawworks of the apparatus to prevent the traveling block from crashing into the crown block or working floor. In one embodiment of the apparatus the velocity of travel of the traveling block and the load being supported by the traveling block are also monitored in order to further restrict raising and lowering of the traveling block to be maintained within predetermined safe limits of operation.

47 Claims, 3 Drawing Figures

WELL DRILLING APPARATUS OR THE LIKE WITH POSITION MONITORING SYSTEM

This invention relates to well drilling apparatus having means for monitoring the relative position of a traveling block which is raised and lowered within the apparatus, and more particularly to such an apparatus in which the monitoring means acurately detects the position of the traveling block by means of periodically transmitted signals reflected back to it from the traveling block.

BACKGROUND OF THE INVENTION

Various devices have been suggested in the prior art to monitor the relative speed, position and load characteristics of a traveling block being raised and lowered within the mast structure or derick of a well drilling apparatus. Further, it has been suggested in the prior art that the monitoring of speed and load be accomplished through use of digital computers and that the outputs of such computers be utilized to control the drawworks to increase the efficiency of the various well drilling operations.

PRIOR ART STATEMENT

For example, Sheldon et al (U.S. Pat. No. 4,128,888) show a velocity control arrangement for a computer controlled oil drilling rig; Sheldon et al (U.S. Pat. No. 4,139,891) show an elevator load control arrangement for a computer controlled oil drilling rig; Smith et al (U.S. Pat. No. 3,942,594) show a drill pipe monitoring system; Delestrade et al (U.S. Pat. No. 3,891,038) show a device for measuring the position and speed of a boring tool; Heffernan et al (U.S. Pat. No. 4,187,546) show a computer controlled oil drilling rig having drawworks motor and brake control arrangement; Smith et al (U.S. Pat. No. 3,942,594) show a drill pipe monitoring system; and Sheldon et al (U.S. Pat. No. 4,119,837) show a block position and speed transducer for a computer controlled oil rig. Also of interest is Garret (U.S. Pat. No. 3,876,972) for a Kelly having a radio transmitter device.

The Smith et al system monitors the speed at which a pipe string is lowered into or pulled out of a well bore and speeds up or slows down the draw works motor to regulate the pipe speed. The throttle position is set by an electrical controller responsive to a computer which calculates the optimum pipe speed. Sheldon et al (U.S. Pat. No. 4,128,888 and U.S. Pat. No. 4,139,891) describe a velocity control arrangement for an oil rig wherein signals representative of predetermined minimum or maximum velocities are compared with actual velocity signals measured by a drum rotation sensor to generate signals which are then used to control the pipe speed by means of a drawworks brake. Also provided in the Sheldon et al drilling rig is a deadline force sensor which produces a signal representative of the weight of the structure supported by the traveling block cable. Martin shows a drawworks control apparatus with a brake that is actuated to slow the cable drum by means of a pulse generator which is responsive to signals from a cable tension sensor. Delestrade et al disclose a device for measuring the position and speed of a boring tool including a sensor for measuring the unwinding of the cable and a tool weight sensor. Heffernan et al disclose an apparatus similar to the Sheldon et al apparatus in which a general purpose digital programmable computer sequentially operates the racker, tongs and drawworks. A closed-loop of the Heffernan et al system controls the drawworks motor and brake.

While it is the primary interest of Shelton et al, for example, to provide a computer controlled well drilling apparatus which controls the speed of the traveling block to achieve maximum efficiency of operation, an object which is also acheiveable with a well drilling apparatus embodied in the present invention, a significant aspect of the present invention is the ability of the drawworks operator normally to control movement of the traveling block except beyond permissible extremities. This permits the drawworks operator to have maximum freedom of control while preventing the traveling block from crashing into the crown block or working floor mounted on the substructure or base of the apparatus, thereby causing a great deal of damage or destruction to the apparatus as well as possible injury or death to the drilling personnel. A mechanical-pneumatic safety device manufactured by Stewart and Stevenson Oil Field Division of Houston, Tex., to prevent the traveling block from exceeding its permissible extremities of travel, utilizes a cam driven by a chain connected to the drawworks shaft. Upper and lower limits of travel are mechanically preset. When the traveling block approaches these limits, a cam follower in the device actuates a pneumatic pilot valve which brakes the drum and prevents the traveling block from exceeding the maximum and minimum preset elevations. Another mechanical-pneumatic device called a crown block saver is manufactured by Koomey, Inc. of Houston, Tex. The crown block saver includes a stainless steel toggle valve cable sensor attachable to the drawworks above drum. The toggle valve cable sensor may be set to trip when too much cable has been spooled onto the drawworks drum indicating that the traveling block is about to exceed its maximum elevation. A pneumatic control system coupled to the toggle valve controls the drawworks brake to automatically stop the traveling block and prevent crashes into the crown block. The Koomey device does not, however, prevent crashes into the working floor or substructure if too much cable is reeled off of the drawworks drum.

Two major problems exist in each of the above described systems. In each instance the position of the traveling block is determined from a mechanical cable or drum sensing means which must be set initially by the drilling personnel each time the well drilling apparatus is assembled to drill a well. Thus, it is necessary that the cable sensors be set by the drilling personnel and be set accurately. Secondly, conditions may change during a well drilling operation which would require resetting of the cable or drum sensors. For example, the cable supporting the traveling block may frey requiring repair or replacement of the cable. In the haste of repairing the oil drilling apparatus, the drilling personnel may forget to reset the sensors or, the drawworks operator may intentionally override the control system to avoid having to reset the sensors, or even if the sensors are reset at this time, there is again the possibility that the sensors will be reset incorrectly. In each of the prior art systems discussed above, resetting of the sensors is generally required whenever the cable supporting the traveling block is lengthened or shortened as the result of repair or replacement. The length of the cable which is being sensed or counted, either directly or by means of the drawworks drum, must then be reset.

It is therefore an object of the present invention to provide an improved monitoring system for an oil drilling apparatus and the like.

It is another object of the invention to provide an improved well drilling apparatus or the like which includes means for accurately monitoring the position of a traveling block as it is raised and lowered within the apparatus.

It is another object of the invention to provide a well drilling apparatus or the like which includes means for accurately monitoring the speed of a traveling block as it is raised or lowered within the apparatus.

Yet another object of the invention is to provide an improved well drilling apparatus or the like which acurately monitors the position of a traveling block being raised and lowered within the apparatus and prevents crashes of the traveling block into the crown block at its upper extremity and/or working floor, rotary table, substructure or base at its lower extremity.

Still a further object of the invention is to provide an improved computer controlled oil drilling apparatus which accurately monitors the position, speed, and load on a traveling block and controls a drawworks in an optimum fashion according to the monitored criteria.

It is yet another object of the invention to provide an oil drilling apparatus which monitors the position of a traveling block within the apparatus and which does not require resetting any time the cable supporting the traveling block is replaced or repaired.

BRIEF DESCRIPTION OF THE INVENTION

These and other objects are accomplished in accordance with the present invention in which a transmitter/receiver device is mounted on the well drilling apparatus which periodically sends signals to the traveling block. Traveling block, for the purpose of this application shall include traveling block and any device which may be coupled to the traveling block such as a hook, elevator, heave compensator, etc. These signals are then reflected by the traveling block back to the transmitter/receiver device which in turn generates a signal indicative of the exact position of the traveling block. The transmitter/receiver device is preferably an infrared radar device which transmits and receives infrared signals but may also be, for example, a sonar device which transmits and receives sound signals, a radar device which transmits and receives radio frequency signals or an optical device which transmits and receives light wave signals of other than infrared frequency. The traveling block preferably includes a reflector or other device for enhancing or amplifying the reflected signals thereby distinguishing the traveling block from any other reflections which may be received from other members of the drilling apparatus. The reflector device being smaller than the traveling block also provides more accurate positional information. The time interval between any particular transmitted signal and the receipt of its reflection by the transmitter/receiver device determines the exact position or elevation of the traveling block regardless of cable length, amount of cable on the drawworks drum, drawworks drum speed, cable speed, etc. The transmitter/receiver device generates a digital output signal indicative of the traveling block's position. By comparing changes in position with a reference time signal, speed and acceleration are additionally determined, as well as direction of travel. A digital controller, preferably an industrial control computer with multi-bit digital data inputs and output ports, analog-to-digital and digital-to-analog converter capability, and high current single bit on-off switching capability, receives the digital position information from the transmitter/receiver device, and is programmed to stop the traveling block if it goes above or below certain preselected limits of travel which are stored in the controller. In one embodiment, the direction of travel as well as the speed and/or acceleration of the traveling block are also monitored by the controller. A load indicator may also be provided, so that the controller takes into consideration the weight or load supported by the traveling block as a factor in determining how long it will take to stop the traveling block and, hence, when to commence applying the brakes to slow down the traveling block. The speed may be gradually varied as the traveling block approaches its maximum and minimum elevations by utilizing a drum braking system which gradually increases the air or hydraulic fluid pressure actuating the brake when a signal to brake is generated by the controller and/or by programming the controller to generate intermittent brake signals thereby causing the brake to be applied intermittently to adjust the speed of the traveling block. Maximum and minimum speeds for raising and lowering the traveling block can accordingly also be preset and controlled. In addition to controlling the drawworks brake, the controller in one electric motor driven drawworks embodiment of the present invention controls the speed and/or ON-OFF state of the electric drive motor, disengagement of the clutch coupling the drive motor to the drawworks drum and power applied to the auxiliary brake. In one diesel engine driven embodiment, the controller controls, in addition to the drawworks main brake, the diesel engine speed and disengagement of the clutch coupling the drive engine to the drawworks drum, as well as the clutch to an auxiliary water brake. Various combinations of electric and non-electric system components are also possible. In addition, displays may be provided to digitally display for the drawworks operator, elevation and speed of the traveling block as well as the load supported by the traveling block.

BRIEF DESCRIPTION OF THE DRAWINGS

Still further objects and advantages of the invention will be apparent from the detailed description and claims when read in conjunction with the drawings in which:

DETAILED DESCRIPTION OF PREFERRED EMBODIMENTS

Figure 1:
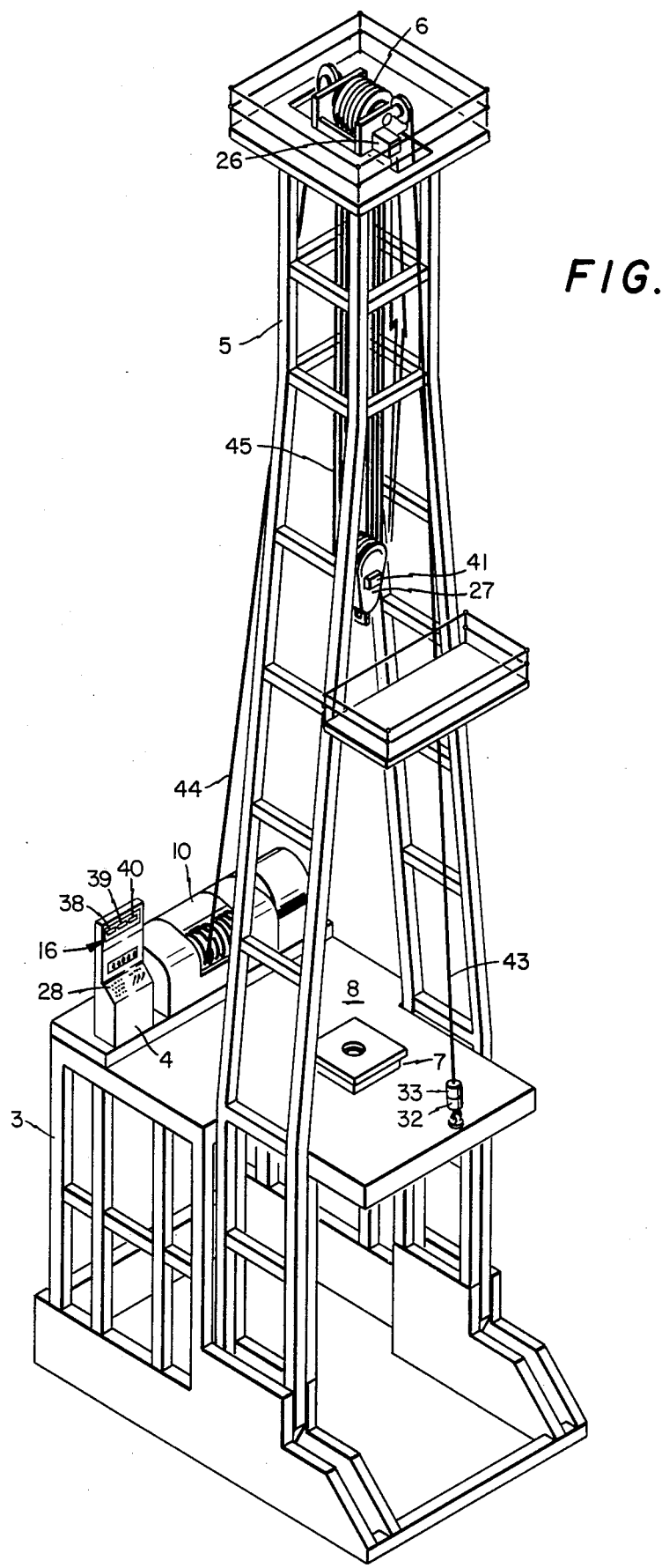
FIG. 1 is a perspective view of a well drilling apparatus having a traveling block position monitoring system in accordance with the present invention.

Referring now to the drawings, and in particular to FIG. 1, a well drilling apparatus embodied in the present invention is illustrated. The well drilling apparatus is comprised of a mast structure or derrick 5 shown in its erected position mounted on a substructure or base 3. Substructure 3 supports a working floor 8 on which is mounted a rotary table 7 and drawworks 10. A set back (not shown) is provided in front of the apparatus for storage of pipe stands. On top of derrick 5 is a crown block 6 having suspended therefrom by cable or line 45, a traveling block 27. The fast line 44 from traveling block 27 extends over a sheave of crown block 6 and is attached to drum 14 of drawworks 10. A dead weight line 43 also extends from the traveling block over a sheave of crown block 6 to a dead line weight indicator 32 which measures the weight of the structure supported by traveling block 27.

Operation of the oil drilling apparatus is generally as follows. The drawworks is utilized to raise or lower pipe stands and drill string into and out of the bore. The lifting or hoisting of the traveling block is generally done by manual control of the electric or diesel motor drive coupled by means of a clutch to the drawworks drum. A manual drum main brake is provided to slow down and stop the drawworks drum and hence the traveling block. The lowering of the traveling block (which may or may not be loaded with a pipe stand or drill string) is done by the manual control of the drum brake in conjunction with an electric or hydrodynamic auxiliary brake which absorbs the potential energy of the traveling block during lowering.

As discussed above, it would be desirable to be able to accurately monitor the position of the traveling block and control the various drawworks systems to prevent the operator from inadvertently exceeding preselected maximum and minimum elevations, and in more complex embodiments, as will be explained herein, maximum speed and load conditions.

Thus, in accordance with the present invention, a transmitter/receiver device 26 is mounted on derrick structure 5 preferably on the side of or next to crown block 6 above traveling block 27 such that a reflector or amplifier device 41 mounted on the side of traveling block 27 (or on a hook, elevator, sheave compensator or some other device coupled to the traveling block) is within the angular detection range of the signals transmitted and received by transmitter/receiver device 26. Although transmitter/receiver device 26 may alternately be mounted on working floor 8, by mounting device 26 next to crown block 6 it is out of the way of the drilling personnel and is closer to the line of travel of traveling block 27.

Drawworks control unit 4 has a display panel 16 which includes a digital elevation display indicator 38, a digital speed display indicator 39, and a digital load display indicator 40. The data provided by these displays is received from a data output port of industrial control computer 28 mounted in control unit 4.

As previously discussed, transmitter/receiver device 26 may be a sonar device, a radio frequency radar device, or an optical frequency radar device. In the present embodiment, a commercial infrared radar or distance measuring device is preferred. For example, in one embodiment of the invention a Hewlett Packard HP 3850A industrial distance meter is coupled through an HP 38001A interface device to a 16-bit data input port of industrial control computer 28. The raw distance data supplied by the HP 3850A along with time information determines position, velocity, and acceleration of reflecting target 41 which is mounted on the side of traveling block 27 generally in line with the optical lens of transmitter/receiver device 26. In such embodiment, reflecting target 27 is a retroprism that reflects the infrared beam generated by transmitter/receiver device 26. The infrared beam is modulated and compared with phase relationship between the returned energy and an internal reference which very accurately determines the distance between transmitter/receiver 26 and reflector target 41, and hence the precise elevation of traveling block 27.

The HP 3850A industrial measurement system utilized in the present embodiment operates in one of three selectable resolutions. Once industrial control computer 28 selects the desired resolution, the HP3850A outputs raw distance data corresponding to the position of the target and the elapsed time between measurements. By scaling and combining the data from all three resolutions, positioning repeatability of 0.04 inches is obtained. The distance measurement rate is thus rapid enough to allow accurate position, velocity and acceleration computations for the traveling block of a well drilling apparatus and the 26,000 foot maximum range of the HP3850A far exceeds the 100 to 150 foot average height of an oil well drilling derrick.

In an embodiment where only three input/output ports are desired, for example, where the position of the traveling block 27 is monitored and only the main brake of the drawworks and drawworks clutch are controlled to stop the traveling block before it reaches preset maximum and minimum elevations, a Hewlett Packard 9825B industrial control computer which has three 16-bit data ports may be utilized. In a more complex embodiment as will next be described with respect to FIGS. 2 and 3, a 7MT industrial control computer manufactured by Texas Instruments Incorporated of Dallas, Tex., having a large number of input/output data ports including built-in or plug-in digital-to-analog and analog-to-digital converters as well as relatively high voltage/current control output ports for controlling the ON/OFF state of various electro-pneumatic or hydraulic control valves is preferred. The Texas Instruments 7MT industrial controller is described in detail in U.S. Pat. Nos. 4,215,395 and 3,215,396.

Figure 2:
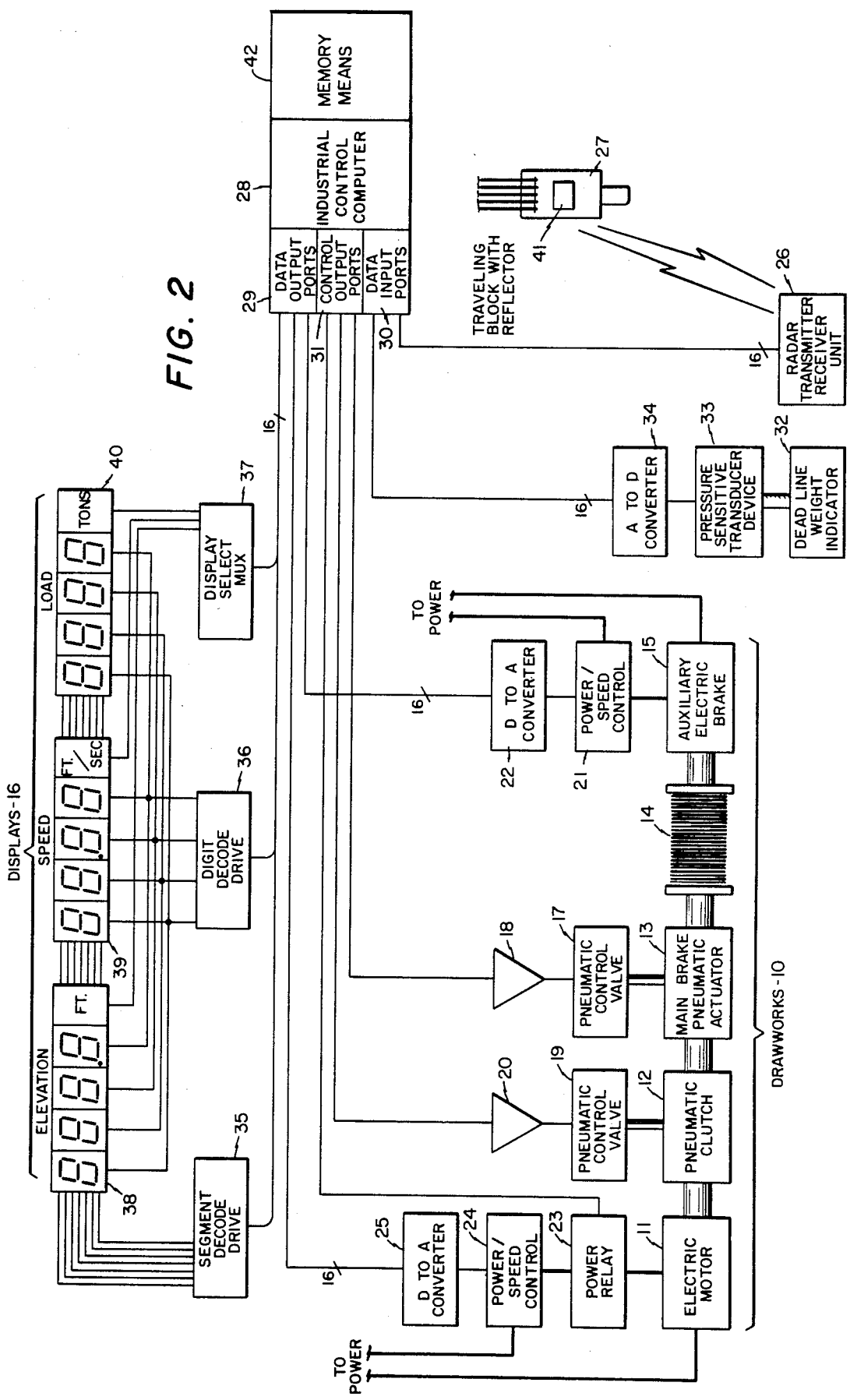
FIG. 2 is a block diagram of one embodiment of a well drilling apparatus with monitoring system according to the present invention in which an electric-motor-driven drawworks is utilized.
Figure 3:
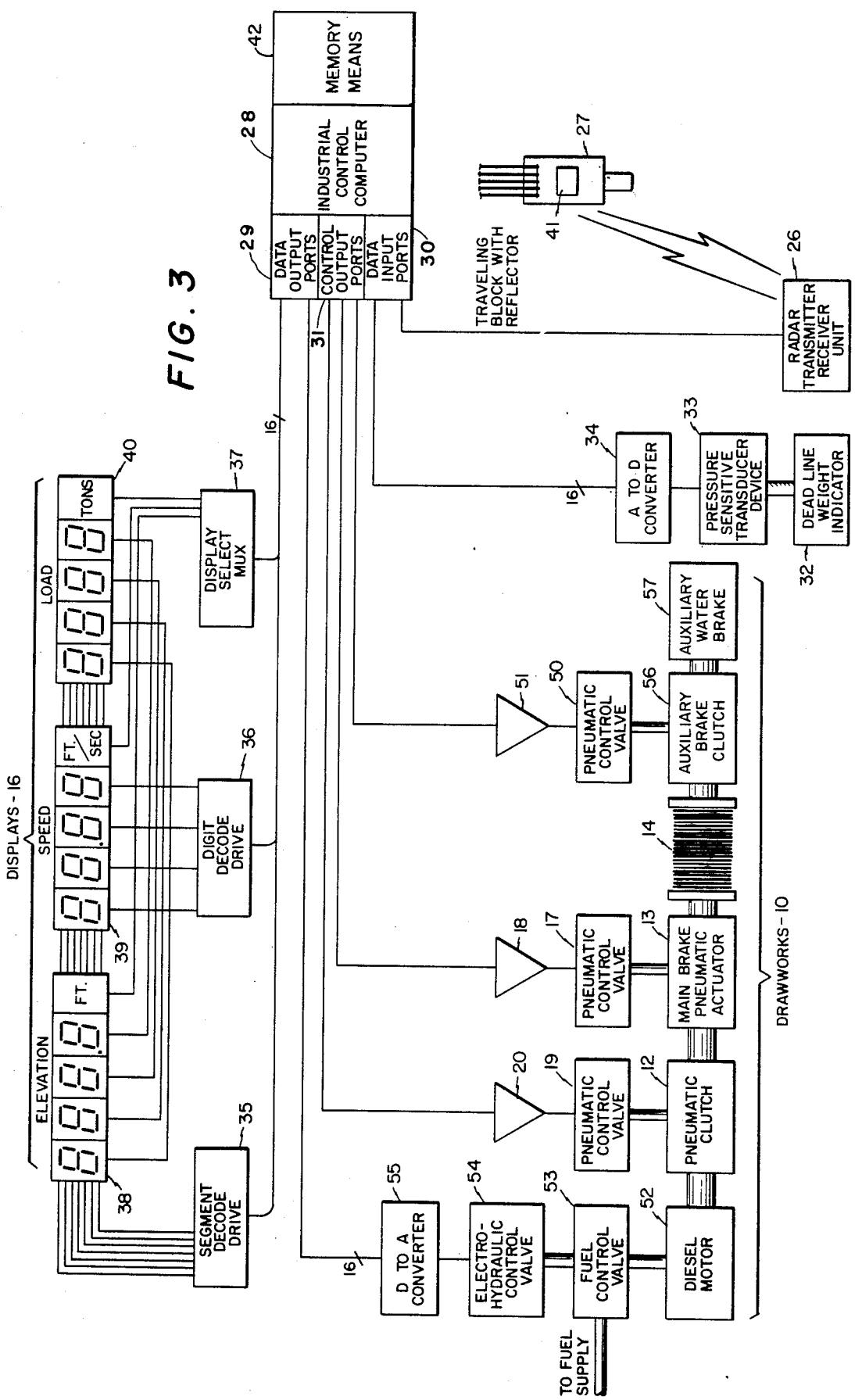
FIG. 3 is a block diagram of another embodiment of a well drilling apparatus with monitoring system according to the present invention, wherein a diesel-engine-driven drawworks is employed.

The well drilling apparatus with position monitoring system of the present invention and its operation will best be understood with reference to the system block diagrams of FIGS. 2 and 3. Referring then to FIG. 2, an electric motor version of an embodiment of the invention is shown which utilizes a drawworks 10 that has an electric drive motor 11 and an electric auxiliary brake 15. In this embodiment, industrial control computer 28 which may be the Texas Instruments 7MT referenced above, has a number of 16-bit data output ports 29 and 16-bit data input ports 30. Also provided are a plurality of single bit controllable data outputs 31 for controlling the ON/OFF state of relatively high current devices such as pneumatic control valves 17 and 19. Mounted in display panel 16 are displays 38, 39 and 40. Display 38 continually digitally indicates the elevation of traveling block 27 within derrick structure 5 for the drawworks operation. Display 39 continually digitally indicates the speed of traveling block 27 within derrick structure 5, and display 40 continually digitally indicates the load or weight being supported by traveling block 27. Although each of displays 38-40 are shown as 4-digit displays, any desired number of digits may be utilized. The data displayed by each of displays 38-40 may be provided through three separate 16-bit ports of data output ports 29 or, as illustrated in FIG. 2, may be generated from a single 16-bit port by means of a display select/multiplexer 37. In the illustrated embodiment, segment decode driver 35, digit decode driver 36 and display select/multiplexer 37 each receive selected bits from the single 16-bit output port 29 to generate the desired displays.

Inputs to industrial control computer 28 are supplied by infrared radar transmitter/receiver unit 26 which provides, for example, 16 bits of digital information indicative of the exact position of reflector 41 on traveling block 27 as described above, and by analog-to-digital converter 34 coupled to dead line weight indicator 32. Dead line weight indicator 32 is a mechanical device which applies a variable pressure, indicative of the weight or load supported by traveling block 27, against pressure sensitive transducer device 33. Pressure sensitive transducer device 33 varies a reference voltage signal which is applied to analog-to-digital converter 34. Analog-to-digital converter 34 thus provides the 16-bit digital signal indicative of the weight or load supported by traveling block 27 to control computer 28 via a respective 16-bit data input port of data input ports 30. Stored in industrial control computer 28 are sets of limits indicative of the maximum extremities of travel, speed, and load of traveling block 27. Thus, in addition to constantly displaying these three parameters on the respective displays of panel 16, industrial control computer 28 provides output control signals to operate electric motor 11, pneumatic clutch 12, main brake pneumatic actuator 13, and auxiliary brake 15. The main brake system controled by computer 28, is comprised of the manual main brake controlled by the drawworks operator with computer controlled actuator, but may alternately comprise a separate braking system so that in the event the manual brake fails, the computer retains control over drawworks drum 14. By controlling these particular functions, traveling block 27 is stopped, preventing crashes into crown block 6 and working floor 8 and, in addition, industrial control computer 28 permits operation of drawworks 10 by the drawworks operator to its maximum capabilities without permitting him to exceed maximum load limits on traveling block 27 which could cause damage to cable. 44-45 and drawworks 10, and maximum speeds of travel and accelerations which might create a dangerous condition.

As can best be understood with reference to U.S. Pat. Nos. 4,215,395 and 4,215,396, sets of parameters are stored in industrial control computer 28: elevation, direction of travel, load and speed. The respective input parameters, obtained from input devices 26 and 32, are periodically tested and compared to the stored sets of parameters. The various controlled devices of drawworks 10 are then operated whenever a set of input parameters exceed a set of stored parameters. The sets of stored parameters may be stored in the memory of industrial control computer 28, such as plug-in read-only memory devices (ROMs) so that the preselected limits of speed and acceleration, load, and limits of travel are unalterably set for a particular size and type of oil well drilling apparatus at the owner's discretion. The drawworks operator would then be unable to change the parameters and thereby exceed the safe limits set by the owner of the apparatus.

One example of a set of stored parameters is shown in Table I, below.

TABLE I

| Ex | Traveling Block Load | Direction of Travel | Velocity of Travel | Distance From Crown Blk/Flr | Controlled Functions |
|---|---|---|---|---|---|
| 1 | empty | raise | 7.5 ft/sec | 20 ft | apply main brake |
|   |   |   | 7.1 ft/sec | 19 ft | release throttle |
|   |   |   | 6.7 ft/sec | 18 ft | release clutch |
| 2 | loaded | raise | 3 ft/sec | 1 ft | apply main brake release throttle release clutch |
| 3 | empty | lower | 6 ft/sec | 16 ft | apply main brake |
|   |   |   | 5 ft/sec | 13 ft |   |
| 4 | loaded | lower | 2.6 ft/sec | 10 ft | aux brake engaged |
|   |   |   | 2.1 ft/sec | 8 ft | adjust brk power |
|   |   |   | 1.5 ft/sec | 6 ft | apply main brake |

Referring to Example 1 of Table I, an empty traveling block is being raised at the rate of 7.5 feet per second. These parameters are determined by computing changes in elevation detected by transmitter/receiver device 26. When transmitter/receiver 26 determines that traveling block 27 is within 20 feet of crown block 6, the computer 28 will take action if the drill rig operator does not manually take such action in order to stop traveling block 27 within a safe distance of, for example, about one foot from crown block 6. The change in elevation or speed is monitored 9 times/per second. At 19 feet from crown block 6, traveling block 27 must have been reduced to a speed of 7.1 ft/sec, at 18 feet to a speed of 6.7 ft/sec, and so forth until the speed of traveling block 27 has been reduced to about 0.3 ft/sec at 2 feet and stopped within about 1 foot from crown block 6. If the speed of travel being monitored exceeds these preselected parameters computer 28 will cause the main brake to be applied and the throttle and clutch released.

Referring to Example 2 of Table I, a traveling block loaded with pipe stands or drill string is raised out of a bore at the rate of three feet per second. Under these conditions, computer 26 must take action to stop the traveling block within one foot of the crown block. The action which is taken by computer 28 is to simultaneously release the throttle and drive clutch and apply the main brake if the drawworks operator fails to do so. The action required with a heavily loaded traveling block is different than the action required with an empty traveling block, since the release of the throttle and clutch will almost instantaneously stop the traveling block from being raised and the main brake must be applied to prevent the loaded traveling block from falling.

Referring to Example 3 of Table I, an empty traveling block is being lowered at the rate of six feet per second. Computer 26 is programmed to apply the main brake within 16 feet of working floor 8 in the event that the drawworks operator has not manually begun to apply the brake. An empty traveling block generally does not require the auxiliary brake to be engaged or powered. Computer 28 will then continually monitor the speed of traveling block 27 until it comes to a complete stop within about one to two feet from working floor 8; at 13 feet the speed should not exceed 5 ft/sec, etc.

In Example 4 of Table I, a traveling block loaded with pipe stands or drill string is being lowered into the bore at the rate of 2.6 feet per second. When the traveling block comes within 10 feet of working floor 8, computer 26 will take action to apply the main brake to prevent the traveling block from crashing into working floor 8 within a safe margin of about one (1) to two (2), unless the drawworks operator has done so. Since the traveling block is heavily loaded and the traveling block is being lowered, computer 26 also makes sure that the auxiliary brake is engaged and that power to the auxiliary brake is sufficient to maintain a desired velocity of travel.

As described above, maximum velocities of travel between the upper and lower "commence stopping points" shown in Table I may also be set so that in the event the drilling operator exceeds these limits, the computer 28 will take action to bring the velocity of travel of traveling block 27 within the maximum preset limits. Minor adjustments to velocity of traveling block 27 which is being monitored by computer 26 can be made by periodic and/or intermittent applications of the main brake and auxiliary brake in combination with the clutches and throttles.

Furthermore, although in the examples of Table I the traveling block load is merely indicated as empty or loaded, the exact load as measured by dead line weight indicator 32 in combination with transducer 33 may be utilized to more precisely compute the amount of distance required to slow down the traveling block and therefore the velocity of the traveling block at each distance from the crown block or working floor at which overriding action must be taken. In the event that a predetermined maximum load is exceeded, the power to the drawworks drive motor will remain OFF with the main brake and auxiliary brakes engaged until required action is taken to reduce the monitored excessive load. In addition, computer 28 monitors power, so that in the event that a power failure to auxiliary brake 15 occurs, the computer actuates the main brake to stop or retard falling of the traveling block, until power is restored.

Power relay 23 is controlled by one of the single-bit output ports 31 of industrial control computer 28. When power relay 23 is deactivated by industrial control computer 28, all power is disconnected from electric motor 11. This occurs when radar transmitter/receiver unit 26 indicates that traveling block 27 has reached its preset upper or lower maximum elevation. A power/speed controller 24 also couples electric motor 11 to its power source. Power/speed controller 24 reduces the power applied to electric motor 11, thereby reducing the speed of electric motor 11 as the clutch is disengaged and the main brake applied. Power/speed controller 24 is a standard electrical motor speed controller with analog input provided by digital-to-analog converter 25. Digital-to-analog converter 25 receives a 16-bit digital control data signal from one of the 16-bit data output ports 29 of industrial control computer 28. The drawworks pneumatic clutch 12 controlled by the drawworks operator is overridden by an electro-to-pneumatic control valve 19. Control valve 19 bleeds the air flow to pneumatic clutch 12 thereby disengaging the drawworks clutch. Power is applied to control valve 19 from one of the single-bit control output ports 31 of industrial control computer 28 through an amplifier circuit 20 which applies the appropriate level of analog voltage to the coils of control valve 19, thereby opening or closing control valve 19. The main brake of drawworks 10 is also pneumatic and is operated by a pneumatic actuator 13. The air flow to pneumatic actuator 13 is controlled by electro-pneumatic control valve 17. Control valve 17 is opened by a current provided from one of the single-bit control output ports 31 of industrial control computer 28 through amplifier circuit 18 which applies the appropriate voltage level to the coil of pneumatic control valve 17.

An auxiliary brake 15 coupled to drawworks drum 14 retards drum 14 as traveling block 27 is allowed to free fall when pneumatic clutch 12 is disengaged by the drawworks operator, thereby slowing traveling block 27 to a desired speed in combination with the application of the main brake as required. The speed of drawworks drum 14 is controlled by the power level applied to auxiliary brake 15. Thus, in addition to the manual control ordinarily provided to the operator, an additional overriding control 21 automatically controls the power applied to auxiliary electric brake 15, in the event the operator permits traveling block 27 to fall too fast. The main brake is also controlled by the computer in this mode.

Referring now to the block diagram of FIG. 3, the system shown is similar to the system of FIG. 2 except that the drawworks is driven by a diesel engine or motor 52 and the auxiliary brake 57 is a hydrodynamic water brake. Thus, a 16-bit digital signal from a data output port 29 of industrial control computer 28 provides a desired throttle control signal in digital form to digital-to-analog converter 55. Digital-to-analog converter 55 generates an analog signal to control electro-hydraulic control valve 54 which adjusts hydraulically controlled fuel valve 53. Fuel valve 53 controls the supply of fuel to diesel engine 52, thereby regulating the speed of diesel engine 52.

Unlike the electically controlled auxiliary brake of FIG. 2, hydrodynamic auxiliary brake 57 can only practically be controlled by means of auxiliary brake clutch 56 and/or by a pneumatically controlled water valve (not shown in FIG. 3) which is similar in its operation to fuel valve 53, discussed above. The ON/OFF signal from one of the single-bit control output ports 31 of computer 28 is applied to pneumatic control valve 50 through an amplifier 51 which provides the correct voltage level to engage and disengage auxiliary brake clutch 56. The controller is programmed so that once auxiliary brake clutch 56 is engaged to retard the fall of traveling block 27, by means of auxiliary brake 57, auxiliary brake clutch 56 will not be disengaged until the traveling block has been stopped either by the drilling rig operator or by automatic computer control of diesel engine 52, pneumatic clutch 12, and main brake pneumatic actuator 13 when traveling block 27 has exceeded a set of lowest permissible speed and elevation conditions above working floor 8. When a pneumatically controlled water valve 3 is included, the valve may be opened to increase the amount of water in the water brake and thereby increase the auxiliary brake's retarding effect.

The transmitter/receiver may be coupled to the computer by means of a electrically conducted or fiber optic cable, or alternately by means of a radio transmitter device at the transmitter/receiver and a radio receiver device at the computer.

Although it is not common in the industry, it is possible to utilize an auxiliary water brake in combination with an electric drive motor to the drawworks drum, or to utilize an electric auxiliary brake in combination with a diesel motor drive to the drawworks drum. This may be accomplished by combining the respective portions of FIG. 2 and FIG. 3.

Various embodiments of the invention have now been described in detail. It should be understood, however, that the foregoing description is merely illustrative of the inventive concepts; various modifications may be made to these details without departing from the spirit of the invention and, within the scope of the appended claims, the invention may be practiced otherwise than as specifically illustrated and described.

What is claimed is:

1. A well drilling apparatus comprising:
   (a) a mast structure having movably mounted therein a traveling block means;
   (b) a drawworks coupled by a cable to said traveling block for controlling the elevation of said traveling block within said mast structure;
   (c) a transmitter/receiver means mounted on said apparatus, said transmitter/receiver means including (i) means for periodically transmitting signals which are reflected by said traveling block means, and (ii) means for receiving the signals reflected by said traveling block means whereby the position of said traveling block means within the mast structure is monitored;
   (d) said traveling block means including a reflector means mounted thereon to enhance the signals being reflected by said traveling block means back to said transmitter/receiver means; and
   (e) control means having a time reference and a memory means and being coupled to said transmitter/receiver means and responsive to the position monitored by said transmitter/receiver means for controlling the drawworks to restrict movement of the traveling block at preselected elevations.

2. The apparatus according to claim 1 wherein said transmitter/receiver means is a radar device.

3. The apparatus according to claim 1 wherein said transmitter/receiver means is an infrared radar distance measuring device which transmits an infrared beam signal to said reflector device, said reflector device being mounted on one side of the traveling block at an angle which reflects the infrared beam signal back to said transmitter/receiver means.

4. The apparatus according to claim 1 wherein said control means controls said drawworks to restrict movement of said traveling block above a preselected elevation which is stored in said control means.

5. The apparatus according to claim 1 wherein said control means controls said drawworks to restrict movement of said traveling block below a preselected elevation which is stored in said control means.

6. The apparatus according to claim 1 wherein said control means controls said drawworks to restrict movement of said traveling block above and below preselected elevations stored in said control means.

7. The apparatus according to claim 1 wherein said drawworks includes drum brake means for stopping rotation of a cable take-up drum and wherein said control means includes means for activating said drum brake means to stop said cable take-up drum and thereby prevent movement of said traveling block beyond said preselected elevations.

8. The apparatus according to claim 7 wherein said control means further includes means for actuating said drum brake means intermittently to slow down said traveling block means when said traveling block means exceeds a preselected velocity stored in said control means.

9. The apparatus according to claim 8 wherein said control means including a means for determining the direction of travel of said traveling block and wherein sets of preselected velocities are stored in said control means to control said traveling block means, the set being utilized depending upon the direction of travel of said traveling block means as determined by whether the traveling block means is moving toward or away from said transmitter/receiver means.

10. The apparatus according to claim 1 wherein said control means includes a programmed digital industrial control computer containing a memory device means for storing therein said preselected elevations.

11. The apparatus according to claim 1 wherein said control means includes a read-only memory device having unalterably stored therein said preselected elevations.

12. The apparatus according to claim 9 wherein said control means includes means for monitoring changes in elevation of said traveling block means with respect to said reference time signal to determine the velocity of said traveling block means.

13. The apparatus according to claim 12 wherein said control means includes means for monitoring changes in the velocity of said traveling block means with respect to said reference time signal to determine the rates of acceleration and deceleration of said traveling block means.

14. The apparatus according to claim 9 wherein said control means includes means for monitoring changes in elevation of said traveling block means with respect to said reference time signal to determine the direction of travel of said traveling block means.

15. A well drilling apparatus comprising:
   (a) a base member;
   (b) a mast structure mounted on said base member;
   (c) a crown block mounted at the top of said mast structure;
   (d) a drawworks mounted on said base member and having a cable drum and a power means for said cable drum;
   (e) traveling block means suspended from a cable to said crown block, a fast line end of said cable extending from said crown block to said cable drum such that rotation of said cable drum selectively raises and lowers said traveling block means within said mast structure;
   (f) a transmitter/receiver means for periodically transmitting signals to said traveling block means and receiving the reflections of said signals from said traveling block means to determine the elevation of said traveling block means within said mast structure; and,
   (g) control means having a time reference and a memory means and being coupled to said transmitter/receiver means and to said drawworks for controlling said cable drum in dependence upon the monitored elevation of said traveling block.

16. The apparatus according to claim 15 including display means coupled to said control means for digitally displaying the elevation of said traveling block means within said mast structure.

17. The apparatus according to claim 15 wherein said control means includes a means for calculating velocity from said transmitter/receiver signals and wherein said transmitter/receiver provides said signals on a pre-set time interval for use in determining velocity including display means coupled to said control means for digitally displaying the velocity at which the traveling block means is traveling in said mast structure.

18. The apparatus according to claim 15 including a dead line coupled to said traveling block and over a sheave of said crown block to a dead line weight indicator.

19. The apparatus according to claim 18 including transducer means coupling said dead line weight sensor to said control means, said control means for additionally controlling said drum in accordance with the weight indicated by said dead line weight sensor means.

20. The apparatus according to claim 19 including display means coupled to said control means for digitally displaying the load supported by said traveling block means.

21. The apparatus according to claim 15 wherein said control means includes an industrial control computer.

22. The apparatus according to claim 15 wherein said drawworks includes an electric motor drive to said drum means and including a power control means coupled to and controlled by said control means to regulate the drive power to said electric motor.

23. The apparatus according to claim 22 wherein said power control means is a power relay for disconnecting power to said electric motor.

24. The apparatus according to claim 22 wherein said power control means is a power regulating means which is responsive to signals generated by said control means for regulating the power being supplied to said electric motor, thereby altering the speed of rotation of said electric motor.

25. The apparatus according to claim 15 wherein a drive motor of said drawworks is selectively coupled by means of a clutch to the cable drum and said apparatus includes means coupling said control means to said clutch for activating and deactivating said clutch under predetermined conditions, monitored by said control means.

26. The apparatus according to claim 15, wherein an auxiliary brake means is provided to retard the movement of the traveling block means during lowering and wherein said control means includes means for controlling said auxiliary brake means under predetermined conditions monitored by said control means.

27. The apparatus according to claim 26 wherein said auxiliary brake means is an electric auxiliary brake and said apparatus includes a power control means responsive to signals generated by said control means for regulating the power being applied to said electric auxiliary brake, thereby altering the amount of torque provided by said auxiliary brake means to retard said traveling block means.

28. The apparatus according to claim 26 wherein said auxiliary brake means is a hydrodynamic auxiliary brake selectively coupled by means of an auxiliary brake clutch to the cable drum of said drawworks and, said apparatus includes means coupling said control means to said auxiliary brake clutch for selectively engaging and disengaging said auxiliary brake clutch under predetermined conditions monitored by said control means.

29. The apparatus according to claim 15 wherein said drawworks includes a diesel engine drive to said cable drum and said apparatus includes a fuel supply control means coupled to and controlled by said control means for regulating engine speed to thereby regulate the speed of rotation of said cable drum.

30. The apparatus according to claim 15 wherein said transmitter/receiver means is a radar device.

31. The apparatus according to claim 15 wherein said traveling block means includes a reflector means mounted thereon to enhance the signals being reflected by said traveling block means back to said transmitter/receiver means.

32. The apparatus according to claim 31 wherein said transmitter/receiver means is an infrared radar distance measuring device which transmits an infrared beam signal through a lens to said reflector device, said reflector device being mounted on one side of the traveling block at an angle which reflects the infrared beam signal back to a lens of said transmitter/receiver means.

33. The apparatus according to claim 31 wherin said traveling block means includes at least one device coupled to said traveling block means and, wherein said reflector means is mounted on said at least one device.

34. The apparatus according to claim 15 wherein said control means controls said drawworks to restrict movement of said traveling block below a preselected elevation which is stored in said control means.

35. The apparatus according to claim 15 wherein said control means controls said drawworks to restrict movement of said traveling block above and below preselected elevations stored in said control means.

36. The apparatus according to claim 15 wherein said drawworks includes drum brake means for stopping rotation of said cable drum and wherein said control means includes means for activating said drum brake means to stop said cable drum and thereby prevent movement of said traveling block beyond said preselected elevations stored in said control means.

37. The apparatus according to claim 36 wherein said control means further includes means for actuating said drum brake means intermittently to slow down said traveling block means when said traveling block means exceeds a preselected velocity stored in said control means.

38. The apparatus according to claim 37 wherein said control means includes a means for determining the direction of travel of said traveling bock means and wherein sets of preselected velocities are stored in said control means said sets being utilized by said control means to compare to the actual velocity of said traveling block means and the direction of travel of said traveling block means to control the velocity of said traveling block means.

39. The apparatus according to claim 36 wherein said control means includes means for sensing a failure of said power means and for activating drum brake means whenever said power failure is sensed.

40. The apparatus according to claim 15 wherein said control means includes a programmed digital industrial control computer containing a memory device means for storing therein said preselected elevations.

41. The apparatus according to claim 15 wherein said control means includes a read-only memory device having unalterably stored therein said preselected elevations.

42. The apparatus according to claim 38 wherein said control means includes means for monitoring changes in elevation of said traveling block means with respect to said reference time signal to determine the velocity of said traveling block means.

43. The apparatus according to claim 42 wherein said control means includes means for monitoring changes in the velocity of said traveling block means with respect to said reference time signal to determine the rates of acceleration and deceleration of said traveling block means.

44. The apparatus according to claim 40 wherein said control means includes means for monitoring changes in elevation of said traveling block means with respect to said reference time signal to determine the direction of travel of said traveling block means.

45. The apparatus according to claim 15 wherein said transmitter/receiver means is mounted on a side of said crown block.

46. The apparatus according to claim 15 wherein said transmitter/receiver means is mounted on top of said mast structure next to said crown block.

47. The apparatus according to claim 15 wherein said transmitter/receiver means is coupled to control means by means of a radar transmitter device coupled to said transmitter/receiver means and a radar receiver device coupled to said control means.

* * * * *